A. L. OLIVER.
BUTTER CUTTER.
APPLICATION FILED JAN. 18, 1912.
1,042,257.
Patented Oct. 22, 1912.
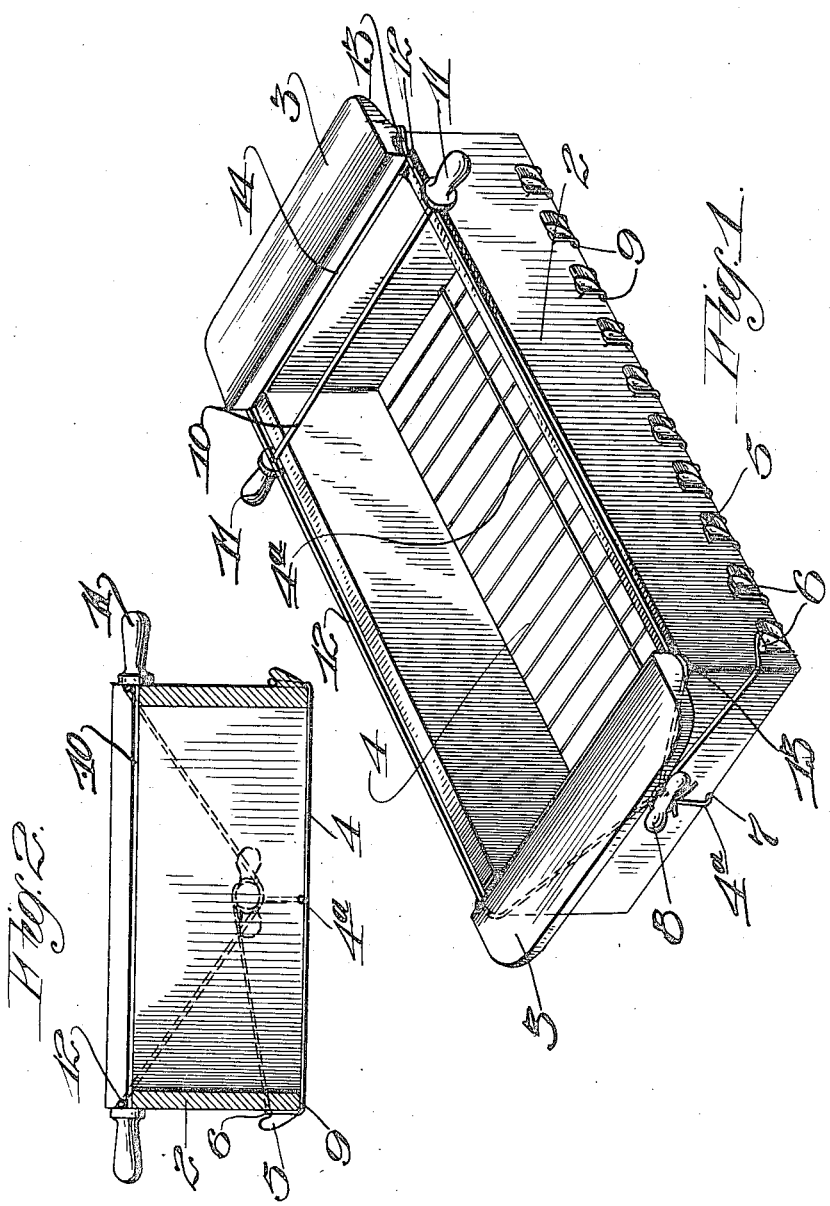

UNITED STATES PATENT OFFICE.

ABE L. OLIVER, OF SAN FRANCISCO, CALIFORNIA.

BUTTER-CUTTER.

1,042,257.

Specification of Letters Patent. Patented Oct. 22, 1912.

Application filed January 18, 1912. Serial No. 671,788.

*To all whom it may concern:*

Be it known that I, ABE L. OLIVER, a citizen of the United States, residing in the city and county of San Francisco and State of California, have invented new and useful Improvements in Butter-Cutters, of which the following is a specification.

This invention relates to butter cutters.

The object of the present invention is to provide a very simple, substantial and sanitary device for the cutting of cakes or prints of butter into blocks of suitable shape.

A further object of the invention is to provide a butter cutting device of as few parts as practicable; these being made of inexpensive and durable material.

The invention consists of the parts and the construction and combination of parts as hereinafter more fully described and claimed, having reference to the accompanying drawings, in which—

Figure 1 is a perspective view of the butter cutter. Fig. 2 is a cross section of the device.

The present invention comprehends a cutter whereby cakes of plastic material, such as butter, may be divided with the least possible number of operations into a plurality of substantial, uniformly shaped and sized blocks.

The main part of the device consists of a frame 2, which may be of glass or other appropriate material, of such length, width and depth as may approximately equal a print of butter or other material to be severed. In the present instance there is illustrated a frame, oblong in shape, of sufficient size to encompass a two-pound print of butter such as now commonly manufactured in certain districts; the depth of the frame being about one-half of the thickness of a print of butter.

At the upper corners of the ends of the frame are provided substantial handles 3 whereby the frame may be firmly forced down over a cake of butter so that the transverse cutting strands 4, which may be wire or other material, will sever the cake or print of butter into a plurality of blocks on vertical lines.

The cutter wires or strands 4 may be composed of one continuous length of wire threaded from side to side of the frame transversely; the wire being looped over upwardly projecting shoulders 5 between the upper ends of which and the adjacent outer surface of the frame 2 are formed grooves or recesses 6 for the reception and retention of the threaded strand of wire forming the cutters 4.

For the purpose of cutting the print of butter longitudinally and centrally, if desired, the wire forming the cutters 4 may be extended lengthwise centrally of the bottom edge of the box or frame 2, as at 4ª, so as to seat in shallow recesses or seats 7 at the lower edge of the ends of the frame; the wire forming the cutters then being extended upwardly and fastened to one or the other of small knobs or cleats 8. The bottom longitudinal edges of the frame are recessed or slotted transversely forming seats 9 for the transverse cutters 4.

When a print of butter is to be severed by the device, the latter is grasped by the handles and registered over the side edges of the butter and the frame is then forced gradually and firmly downward, at which time the bottom wires or cutters will sever the block transversely and longitudinally simultaneously.

The print of butter is divided horizontally into two equal sections by means of a cutter wire 10 extending transversely across the upper edges of the frame 2 and being attached to suitable knobs or handles 11 slidable along the vertical outer sides of the frame 2; the cutter 10 being restrained in position by a removable retainer or guard 12 formed by threading a continuous wire from one of the knobs 8 upwardly through grooves 13, thence along and just above the upper surface of the sides of the frame 2 and carried around the opposite end of the frame end and handle 3.

When the transverse movable cutter member 10 is at either extreme portion of the frame 2, it may recede in a recess or channel 14 near the edges formed on the inner surface of each end of the frame. The purpose of these channels 14 is to permit the adjustment of the movable cutter 10 so that the frame 2 may be passed over the top surface of the print or cut of butter without the cutter 10 interfering. When the bottom cutters 4 and 4ª have been pressed entirely through the print of butter until the frame 2 rests on the support on which the butter rests, the operator then shifts the movable cutter 10 longitudinally of the frame 2 by placing a thumb on one side and a finger on the other side of the frame so as to push the handles or knobs 11; the cutter moving through the butter to sever it horizontally, thus forming a plurality of rectangular blocks.

It is manifest that the present construction provides a substantial, sanitary and easily operated device having but one movable element and no accurate or precise adjustment of the parts is required.

Having thus described my invention, what I claim and desire to secure by Letters Patent is—

1. A butter cutter comprising a suitably shaped frame open at two sides and having handles across the ends adjacent to one of the open sides, removable cutters mounted on the lower edge of the frame and extending across the same, and a transversely extending, longitudinally movable cutter adjustable across the upper edges of the frame between the handles.

2. A butter cutter comprising a suitably shaped frame open at two sides and having handles across the ends adjacent to one of the open sides, removable cutters mounted on the lower edge of the frame and extending across the same, a transversely extending, longitudinally movable cutter adjustable across the upper edges of the frame between the handles, and a removable guide structure for said adjustable cutter.

In testimony whereof I have hereunto set my hand in the presence of two subscribing witnesses.

ABE L. OLIVER.

Witnesses:
CHARLES EDELMAN,
C. C. COOK.